United States Patent

[11] 3,553,485

| [72] | Inventor | Frank C. Hassett<br>Chelmsford, Mass. |
|---|---|---|
| [21] | Appl. No. | 653,919 |
| [22] | Filed | July 17, 1967 |
| [45] | Patented | Jan. 5, 1971 |
| [73] | Assignee | RCA Corporation<br>a corporation of Delaware |

[54] RFI-PROTECTED FLIP-FLOP
9 Claims, 4 Drawing Figs.

| [52] | U.S. Cl. | 307/202,<br>307/292; 328/206 |
|---|---|---|
| [51] | Int. Cl. | H03k 7/20 |
| [50] | Field of Search | 307/202,<br>289, 291, 292, 214, 218; 328/8, 9, 10, 206 |

[56] References Cited
UNITED STATES PATENTS

| 2,531,076 | 9/1950 | Moore, Jr. | 307/292 |
| 2,605,306 | 7/1952 | Eberhard | 307/291X |
| 2,782,306 | 2/1957 | Dickinson | 328/206X |
| 3,286,103 | 11/1966 | Clapper | 307/289X |
| 3,363,115 | 1/1968 | Stephenson et al. | 307/289X |

*Primary Examiner*—Donald D. Forrer
*Assistant Examiner*—R. C. Woodbridge
*Attorney*—John V. Regan

ABSTRACT: A radio frequency interference (RFI) protected flip-flop is described in an RFI environment of a computer controlled test area for mass produced articles. The RFI protected flip-flop includes an integrating feedback capacitor for each inverter device of the flip-flop.

RFI-PROTECTED FLIP-FLOP

CROSS-REFERENCE

A patent application, Ser. No. 653,083, entitled "DIGITAL COMPUTER CONTROLLED TEST SYSTEM", filed Jul. 13, 1967, by Walter Endres Bahls et al. and assigned to the present assignee describes a testing system for mass produced articles in which RFI noise may severely disturb the state of flip-flops in a digital control system located in the test area.

BACKGROUND OF THE INVENTION

Digital systems generally include various functional switching networks which employ bistable multivibrators or flip-flops as basic storage and/or control elements. In most digital systems, the object is to have high speed flip-flops; i.e., the flip-flops are capable of changing state at very high rates (on the order of 0.5 to 10 megacycles). Thus, various techniques have been employed to speed up the response time of the flip-flop.

When a digital system having high speed flip-flops is placed in a radio frequency interference (RFI) environment, the flip-flops are subject to erroneous switching from RFI noise. One such RFI environment may be a testing area for mass produced articles, such as the testing area described in the aforementioned copending application. As described therein, a remotely located computer sends various test commands to a local controller located at the test area. The test command may be a command or instruction word which is stored in a local command register of the local controller. The local command register includes a bank of flip-flops, the outputs of some of which control the relay switching of high voltage (on the order of 1,000 volts and more) from a local power supply along various high voltage lines to any one or more of various test stations. Others of the local command register flip-flops control further relay switches located at each test station for connecting the test voltage stimuli to the appropriate elements of the unit to be tested.

The troublesome RFI noise in such a system may arise, for example, due to the resulting surge on the high voltage lines or due to high voltage arcs internal to the test article. Sophisticated shielding techniques, while helpful, do not reliably prevent the local command register flip-flops from being disturbed by the RFI noise.

The present invention relates to RFI protected bistable multivibrators or flip-flops.

BRIEF DESCRIPTION OF INVENTION

According to the illustrated example of the invention, a pair of inverting type amplifying devices are cross-coupled to form a bistable multivibrator or flip-flop. Radiofrequency noise is suppressed by connecting separate feedback capacitors between the input and output circuits of each inverter device. The feedback capacitors operate in a regenerative mode to suppress RFI noise as well as to provide relatively slow rise and fall time outputs.

DESCRIPTION OF PREFERRED EMBODIMENT

Figure 1:
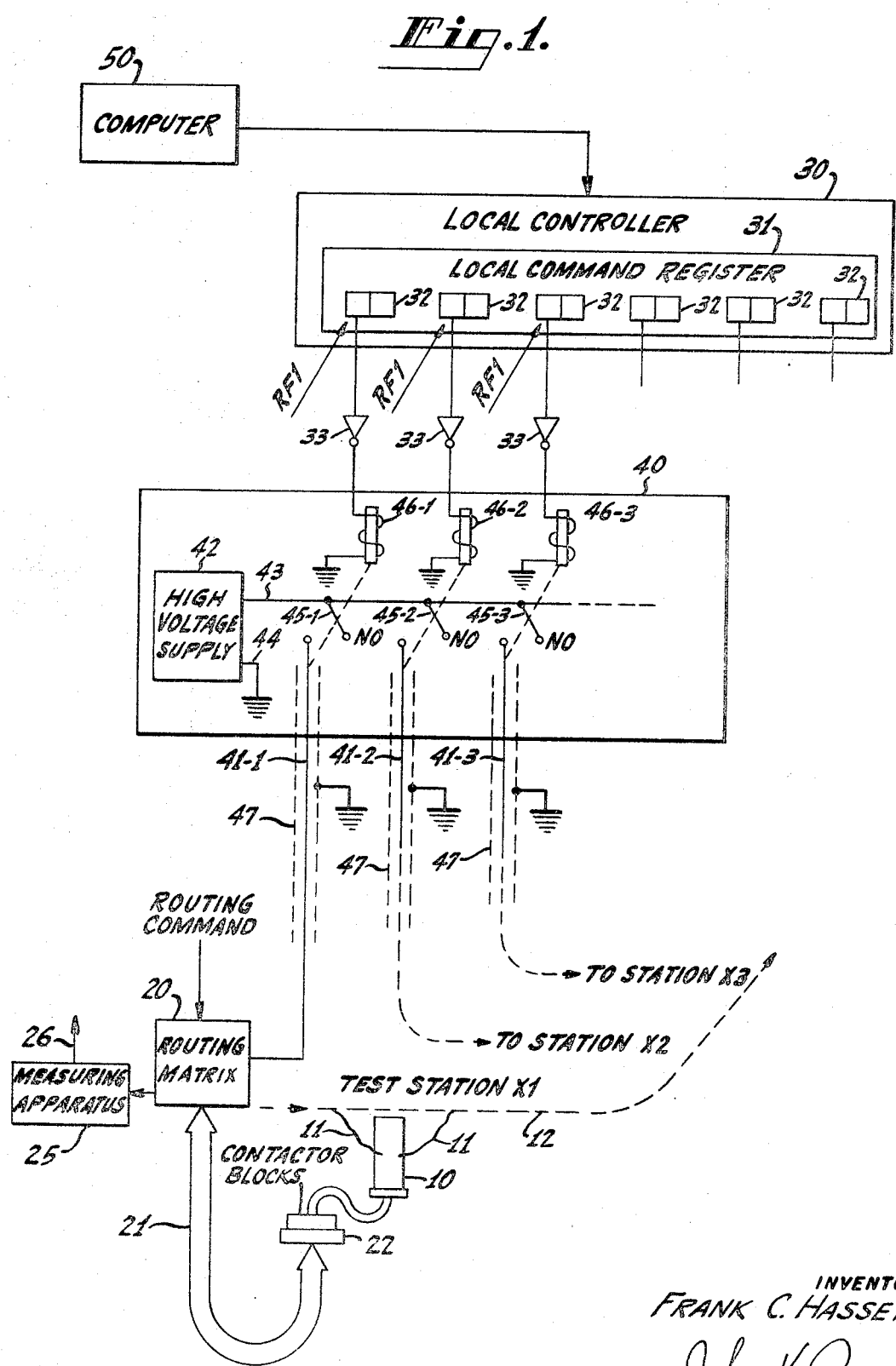
FIG. 1 is an example of an RFI environment in which the present invention is useful.

Referring initially to FIG. 1, an RFI environment is illustrated as a test area for mass produced articles. One such article 10 is shown as attached by means of brackets 11 to a conveyor system designated by the dashed line 12. The conveyor system 12 is adapted by means (not shown) to convey the article 10 to a number of test stations of which only three designated as X1, X2 and X3 are shown.

Also located at the test area but perhaps several feet (25 feet in one exemplary test system) away from the various test stations X1, X2 and X3 is located a local controller 30 and a local power supply unit 40. The local controller 30 responds to various commands from a computer 50 to route various high voltage stimuli from the local power supply 40 by way of high voltage lines 41-1, 41-2 and 41-3 to the various test stations X1, X2 and X3. The computer 50, by way of example, may be located remote from the test area.

The commands or instructions from the computer 50 may be in the form of a command or instruction word which is received by the local controller 30 and stored in a local command register designated 31. The local command register 31 includes a number of flip-flops 32, some of which are connected by way of relay drivers 33 to the coils of various relays located within the power supply unit 40. Others of the flip-flops 32 may have their outputs connected to routing matrices located at the individual test stations, for example to the routing matrix 20 at the test station X1.

The power supply unit 40 includes a number of voltage supplies and a large number of relays arranged in a programmable switching network to switch desired ones of the voltage supplies to desired ones of the test stations X1, X2 and X3. For the sake of simplicity of illustration, only one voltage supply 42 is shown. The voltage supply 42 is illustrated as a high voltage supply (on the order of 1,000 volts or more). The supply 42 has a first high voltage terminal designated 43 and a second terminal 44 connected to the system reference potential, arbitrarily designated as the ground reference by the conventional symbol therefore in FIG. 1. The high voltage terminal 43 is connected to the switching elements 45-1, 45-2 and 45-3 of a number of relays 46-1, 46-2 and 46-3. The coils of the relays 46-1, 46-2 and 46-3 are connected to the outputs of the relay drivers 33. The relays 46-1, 46-2 and 46-3 responds to the outputs of the associated flip-flops 32 of the local command register to either switch or not switch the high voltage terminal 43 to the associated high voltage lines 41-1, 41-2 and 41-3 according to the state of the associated flip-flop. This switching of the high voltage terminal 43 to the high voltage lines 41-1, 41-2 and 41-3 results in a surge of voltage which causes severe RFI noise in the test area. This RFI noise severely disturbs the flip-flops 32 in the local command register and can cause them to reset or set. It has been found that conventional type flip-flops reset or set in response to RFI noise even though the high voltage lines 41-1, 41-2 and 41-3 are protected by grounded shields 47.

It should be noted at this point that in addition to each of lines 41-1, 41-2 and 41-3, other test stimuli lines extend between the power supply unit 40 and the test stations X1, X2 and X3. Since the test stations X1, X2 and X3 are similar, only the station X1 is illustrated in any detail. The various test stimuli lines, including the high voltage line 41-1 coming into the station X1 are connected to a routing matrix 20. The routing matrix 20 is connected by way of a bus 21, which includes a number of individual connecting lines, to a pair of contactor blocks 22. One of the contactor blocks 22 is located at the station X1; while the other contactor block travels with the article 10 along the conveyor 12. The contactor blocks 22 serve to connect the individual lines of the bus 21 to the various elements of the article 10.

The routing matrix 20 also receives routing commands from the computer 50 via the local command register 31 to route the test voltage stimuli to selected elements of article 10 and to connect desired elements to a measuring apparatus 25 which measures and/or detects the response to the various test voltages. The measuring apparatus 25 has an output 26 which may send the response information to the computer 50 or to the local controller 30 or to any other suitable processing equipment.

Other sources of RFI noise which may effect the flip-flops 32 in the illustrated test area include high voltage arcs which may be generated internal to the article 10 during testing.

Figure 2:
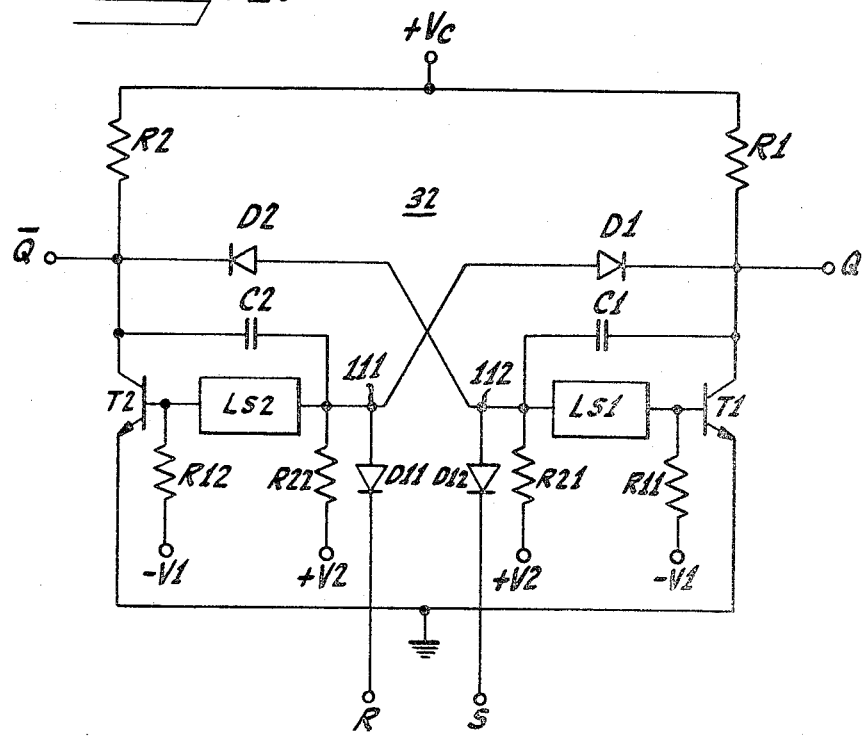
FIG. 2 is a schematic circuit diagram of an RFI protected flip-flop according to the present invention.

The flip-flops 32 and other flip-flops (not shown) in the local controller 30 as well are protected from RFI noise in accordance with the present invention as illustrated in FIG. 2. In FIG. 2, the flip-flop 32 is illustrated as a pair of cross-coupled inverting type amplifying devices T1 and T2. The devices T1 and T2 are illustrated, by way of example, as bipolar transistors of the N-P-N type. It should be noted that P-N-P transistors could also be employed by appropriately connecting the bias and power supplies. The transistors T1 has its output or collector electrode connected by way of a load resistor R1 to a voltage supply designated $+Vc$ for the illustrated N-P-N transistors. Likewise, the transistor T2 has its collector electrode connected by way of a load resistor R2 to the positive supply $Vc$. The transistors T1 and T2 have their common or emitter electrodes connected to circuit ground.

The transistors T1 and T2 are cross-coupled from the collector of each to the input or base electrode of the other. In the cross-coupling loop between the collector electrode of transistor T1 and the base electrode of transistor T2 is a level setting means LS2 and a diode D1. Similarly, a level setting means LS1 and a diode D2 is included in the cross-coupling loop between the collector electrode of transistor T2 and the base electrode of transistor T1. Associated with the level setting network LS2 is a first resistor R12 for connecting one terminal thereof to a negative source of potential designated $-V1$ and a second resistor R22 for connecting the other terminal thereof to a positive source of potential designated $+V2$. Similarly, resistors R11 and R21 connect the level setting means LS1 to the sources designated $-V1$ and $+V2$, respectively.

The diode D1 together with an input diode D11 form a gating network at the input node 111; while the diode D2 together with the diode D12 forms another gating network at the input node 112. It should be noted at this point that these diodes may just as well be resistors or any other suitable gating elements. The level setting means LS1 and LS2 may be any suitable networks for responding to the outputs of the associated gating networks. For the illustrated diode gating networks, the level setting means may also include diodes.

An output designated Q is taken from the collector electrode of transistor T1; and the complementary output $\overline{Q}$ is taken from the collector electrode of the other transistor T2. A set input S is illustrated as being applied to the gating diode D12; while a reset input R is illustrated as being applied to the gating diode D11.

In accordance with the invention, a capacitor C1 is connected between the collector electrode of the transistor T1 and its base circuit; while another capacitor C2 is connected between its collector electrode and its associated base circuit. As illustrated in FIG. 2, the capacitor C1 is connected between the collector electrode of transistor T1 and the associated input node 112; while the capacitor C2 is connected between the collector electrode of transistor T2 and the associated input node 111. These capacitors C1 and C2 function as regenerative feedback capacitors in response to RFI noise so as to reinforce the state (either the conducting or the cutoff state of the associated transistor).

A typical operational sequence for the flip-flops 32 in FIG. 1 includes a reset interval followed by a conditional set interval and a control interval. During the reset interval all of the flip-flops 32 which are associated with a given control function, e.g. a given power supply, are reset. During the conditional set interval, the above-mentioned flip-flops 32 are either set or not set in accordance with the command or instruction word. During the control interval the outputs of the flip-flops control the various tests at the test stations X1, X2 and X3.

For the reset condition, the output Q is at a low voltage level or ground potential. The transistor T1 is turned on and transistor T2 is turned off. The reset condition may be caused by a negative (relative to $+Vc$) pulse of suitable duration at the R input. During the set interval, the flip-flop may be set by applying a negative (relative to $+Vc$) pulse to the S input. For the set condition, the transistor T1 is turned off and the transistor T2 is turned on. The diodes D1 and D2 hold the state of the flip-flop by gating the associated output voltages Q and $\overline{Q}$ to the input nodes 111 and 112, respectively.

Figure 3:
FIG. 3 is an output waveform graph for the FIG. 2 flip-flop without the feedback capacitors.

A typical output waveform in FIG. 3 illustrates the operation for the flip-flop 32 without the feedback capacitors C1 and C2. This waveform is for the Q output and varies between the supply voltage $Vc$ and ground potential, assuming negligible leakage current and negligible voltage drop from the collector to the emitter electrode of a saturated transistor. Note that the transitions of the waveform are relatively steep representing fast rise and fall times. Without the capacitors C1 and C2, the flip-flop 32 responds to relatively short duration RFI noise spikes to become reset during the conditional set and control intervals.

The flip-flop operation with the capacitors C1 and C2 is as follows. Assume that the flip-flop is set so that transistor T2 is conducting and transistor T1 is turned off. The effects of negative RFI spikes induced on the collectors of transistors T1 and T2 are considered first. The negative RFI spikes on the collector of the conducting transistor T2 are essentially short circuited to ground via the low impedance collector-emitter path of transistor T2. On the other hand, the negative RFI spikes on the collector of the cutoff transistor T1 are regeneratively fed back via capacitor C1 to the base circuit of transistor T1 so as to reinforce the cutoff state of the transistor.

The negative going RFI noise spikes are coupled by the capacitor C1 from the collector electrode of transistor T1 to the input anode 112. The node 112 goes negative thereby cutting off the diodes D2 and D12. The charge or discharge circuit for the capacitor C1 is selected to have a relatively large resistive value so that the resultant RC time constant is long relative to the RFI noise spike duration. Thus, the resistors R1 and R21 should have relatively large values. For the situation where resistive gating networks are utilized, the various gating resistors should have large values in order to make the RC time constant relatively long compared to the RFI noise spike duration. Similar considerations apply for the resistors R2 and R22 in the charge or discharge circuit for the capacitor C2.

Positive RFI pulses induced on the collector of the conducting transistor T2 tend to make it nonconducting. However, the capacitor C2 regeneratively feeds back the RFI pulses to the base circuit so as to reinforce the conducting state of the transistor. On the other hand, positive going RFI spikes on the collector of the cutoff transistor T1 are conducted via capacitor C1, diode D2 and transistor T2 to ground. That is, they have a similar effect as positive going RFI spikes on the collector electrode of transistor T2 in that they tend to make T2 nonconducting. As explained previously, capacitor C2 prevents this by providing a regenerative feedback. Thus, the $\overline{Q}$ output will remain at ground (0 volt) thereby holding node 112 slightly above ground whereby transistor T1 remains cut off.

Relatively short duration RFI pulses induced in the base circuits of the transistors T1 and T2 are integrated by the capacitors C1 and C2 so that the base-emitter voltages of the respective transistors are maintained at substantially their current value during the RFI pulse duration. In particular, the junction 111, (or 112) of an associated conducting transistor cannot rapidly fall negatively due to an RFI regional, since such signals couple through an effective impedance (radiation impedance) to the junction. The impedance between the junction and ground (impedance of the capacitor in series with the associated collector to ground) is much lower than the radiation impedance. Therefore, the RFI voltage drop appears across the radiation impedance for some finite time, until the capacitor charges. Since the conducting transistor will not cut off due to RFI, for some finite time, it prevents the nonconducting transistor from turning on by maintaining ground potential at the junction 112 (or 111) of the nonconducting transistor. The effect is not symmetrical; that is, the nonconducting side is much more susceptible to RFI, since its C is returned through resistor R1 (or R2), a higher impedance.

Figure 4:
FIG. 4 is an output waveform graph of the FIG. 2 flip-flop with the feedback capacitors.

The output waveform in FIG. 4 illustrates the operation of the flip-flop with the feedback capacitors C1 and C2. This waveform is for the Q output and varies between the supply voltage Vc and ground potential. Note that the transitions of the waveform are inclined relative to the FIG. 3 waveform thereby representing relatively slow rise and fall times. The RFI noise pulses are considered to have durations relatively short compared to the rise and fall times of the output waveform.

I claim:

1. An RFI-protected flip-flop combination wherein a pair of inverting type amplifying devices are cross-coupled from the output of each to the input circuit of the other to form a pair of cross-coupling loops; the improvement comprising:
   a pair of capacitors each coupled between the output and input circuit of a different one of the inverter devices to provide regenerative feedback of RFI noise spikes;
   level setting means included in the input circuit of each of said devices;
   a first gating element included in the input circuit of each of said devices; and
   a second gating element included in each cross-coupling loop for forming a gating circuit with said first gating element.

2. The invention according to claim 1 wherein each capacitor is coupled to the junction of the associated level setting means and gating circuit.

3. The invention according to claim 2 wherein the pair of amplifying devices is a pair of bipolar transistors having collector circuits and base circuits corresponding to said output and input circuits, respectively.

4. The invention according to claim 3 wherein the gating elements are unidirectional conducting devices.

5. A noise insensitive storage circuit comprising, in combination:
   first and second inverters, each having an input terminal and an output terminal;
   means for cross-coupling the input terminal of each inverter to the output terminal of the other to form first and second cross-coupling paths;
   first and second level setting means, the first included in the first cross-coupling path and the second included in the second cross-coupling path; and
   means responsive to a noise pulse received at an output terminal of either one of said inverters, of a polarity and amplitude normally sufficient to change the storage state of said storage circuit, for regeneratively coupling said pulse via the level setting means of said inverter to the input terminal of said inverter for preventing said storage circuit from changing state.

6. The combination claimed in claim 5, wherein each cross-coupling path comprises a diode in series with a level setting means, each diode being poled to conduct current in the forward direction from an input terminal through a level setting means through said diode and through an inverter, and wherein said means responsive to a noise pulse comprises first and second capacitors, the first connected between the output terminal of said first inverter and the connection between the diode and level shifting means leading to the input terminal of said first inverter, and the second connected between the output terminal of the second inverter and the connection between the diode and level shifting means leading to the input terminal of said second inverter.

7. In combination:
   a flip-flop including two amplifiers, each having a control electrode and an output electrode, and including a signal transmission path between the output electrode of each amplifier and the control electrode of the other amplifier, each such path comprising an impedance in series with a voltage level shifting circuit and a circuit for reducing the sensitivity of said flip-flop to noise spikes comprising two regenerative feedback paths, one connected between the output electrode of one amplifier and the connection between the impedance and level shifting circuit leading to the control electrode of said one amplifier, and the other connected between the output electrode of the other amplifier and the connection between the impedance and level shifting circuit leading to the control electrode of said other amplifier.

8. The combination as set forth in claim 7, further including a circuit coupled to each feedback path for permitting the discharge of any charge which tends to accumulate in said discharge path, each such circuit having a long discharge time constant relative to the duration of a noise spike.

9. The combination as set forth in claim 7, wherein each impedance comprises a diode and each feedback path comprises a capacitor, and further including a resistive discharge path connected across each capacitor having a value such that the resistor-capacitor discharge time-constant is relatively long compared to the duration of a noise spike.